(12) United States Patent
Bohm et al.

(10) Patent No.: US 6,370,385 B1
(45) Date of Patent: Apr. 9, 2002

(54) MOBILE COMMUNICATION NETWORK

(75) Inventors: Christer Bohm, Stockholm; Lars Gauffin, Ronninge, both of (SE)

(73) Assignee: Net Insight A.B., Stockholm (SE)

( * ) Notice: Subject to any disclaimer, the term of this patent is extended or adjusted under 35 U.S.C. 154(b) by 0 days.

(21) Appl. No.: 09/329,904

(22) Filed: Jun. 10, 1999

(51) Int. Cl.[7] .................................................. H04Q 7/00

(52) U.S. Cl. .......................... 455/450; 455/437; 455/452

(58) Field of Search .................................. 455/450, 451, 455/432, 453, 437, 422

(56) References Cited

U.S. PATENT DOCUMENTS

| 5,761,619 | A | | 6/1998 | Danne et al. | 455/422 |
|---|---|---|---|---|---|
| 5,838,687 | A | * | 11/1998 | Ramfelt | 370/443 |
| 5,960,002 | A | * | 9/1999 | Ramfelt et al. | 370/450 |
| 6,157,656 | A | * | 12/2000 | Lingren et al. | 370/458 |

* cited by examiner

Primary Examiner—Daniel Hunter
Assistant Examiner—Thuan T. Nguyen

(57) ABSTRACT

The present invention refers to transferring of data in a mobile communication network. According to the invention, data is transferred between one or more mobile switching centers and one or more of a plurality of base stations via one or more controllers, each controlling a respective group of the plurality of base stations, at least in part using a Dynamic Synchronous Transfer Mode type network.

12 Claims, 7 Drawing Sheets

MOBILE COMMUNICATION NETWORK

FIELD OF INVENTION

This invention relates to the area of switching and transferring data in a mobile communication network. More particularly, this invention refers to a method and a network for interconnecting base stations and mobile switching centers.

BACKGROUND OF THE INVENTION

The past decade has seen a large deployment of mobile, or cellular, communication systems. Systems such as GSM (Global System for Mobile communication), GPRS (General Packet Radio Service), and CDMA (Code Division Multiple Access) have grown dramatically in coverage, leaving almost no white spots left on the geographical map. With the planned migration and integration into the third generation mobile system UMTS (Universal Mobile Communication System), a remaining obstacle for further increased deployment has been overcome.

With the increased geographical coverage and public usage of such systems follows increased requirements on system capacity and system redundancy. From an operator point of view, requirements on simplicity and efficiency in terms of system design and maintenance become more pronounced.

In a typical prior art mobile communication network, using GSM and GPRS (and UMTS) as an example (see FIG. 1 for reference), the mobile switching center MSC, or its GPRS equivalent SGSN (Serving GPRS Support Node), form the heart of the network. Typically, a transport network is used to transport traffic between the MSC/SGSN and one or more gateways to public switched telecommunication networks and/or to packed data networks, such as an X.25 network or the Internet.

To each MSC/SGSN, a set of base station controllers BSC, (referred to as radio network controllers RNC in UMTS), are connected, and each base station controller is in turn arranged to control a respective set of base transceiver stations, each covering a respective geographical area, or cell, the system in all forming a well defined hierarchical structure.

A problem with such a prior art network is that if a BSC or an MSC goes down, it affects all base stations served by that BSC or MSC, thus disabling mobile access within the affected area. Another problem is that, as a result of the system distribution required to provide for geographical coverage, system maintenance and operation require deployment of manpower and other resources at many different geographical sites. Also, the task of synchronizing the operation of base stations for multi base station transmission requires the distribution of clock information, which for example is complicated in relation to base stations are not controlled by the same BSC/RNC.

OBJECTS OF THE INVENTION

It is accordingly an object of the invention to provide a method and a network that provide for simplified mobile communication network maintenance and operation.

It is further an object that the method and network allow for increased redundancy in case of, for example, a BSC or MSC failure.

It is also an object of the invention that it offers a simplified way of providing synchronization of base station operation.

SUMMARY OF THE INVENTION

The present invention overcomes the above described problems and deficiencies of the prior art by providing an improved mobile communication method and network by interconnecting mobile switching centers and base station controllers (radio network controllers) and/or base station controllers and base transceiver stations using, at least in part, a Dynamic synchronous Transfer Mode (DTM) type network.

Moreover, according to a preferred embodiment of the invention, the hierarchical relationship between the mobile switching centers, the control stations, and the base stations is controlled by the definition of logical channels within the Dynamic Synchronous Transfer Mode type network.

A Dynamic synchronous transfer mode network provides a multi-access scheme that is used according to the invention to define connectivity on a logical level more or less independently with respect to the underlying physical topology. The invention therefore provides the advantage of significantly increasing the manageability of a mobile communication network.

The DTM network may for example be used to interconnect a mobile service center and the base station controllers (radio network controls) associated therewith, as well as to interconnect a base station controller and the base transceiver stations controlled thereby.

According to an aspect of the invention, data is transmitted between a plurality of mobile switching centers, base station controller and/or base stations over the same physical DTM network, wherein the hierarchical relationship between the different components physically connected to the same network (MSC, BSC, BTS) is defined on a logical level by the establishment of logical TDM channels over the DTM network. Since the need of providing a hierarchical relationship between the components on a physical level is thereby eliminated, the mobile switching center and the base station controllers may in fact be physically positioned at any desired location as long as access is provided via channels within the DTM network. For example, a plurality of MSCs and/or a plurality of BSCs/RNCs may be placed at the same geographical location, thereby advantageously simplifying network maintenance and operation.

Also, in case, for example, a mobile switching center or a base station controller were to fail, another mobile switching center or base station controller can take over the role of controlling the affected area since the hierarchical relationship may, at least to some extent, be re-defined using logical channels within the DTM network and is not limited by the physical connectivity constraints of prior art.

Furthermore, as DTM is a synchronous scheme, operating at a frame rate of nominally 125 $\mu$s, the task of providing synchronization in case of multi base station transmissions is simplified by the access to the DTM 125 $\mu$s frame clock. This synchronization reference may, for example, be used by the base stations as means for avoiding intersymbol interference when transmitting data.

According to another aspect of the invention, as connectivity may be defined on a logical level within the DTM network, the same DTM network as mentioned above is used to carry data between the mobile switching centers (MSC or SGSN) and the gateway to the Public Switched Telecommunication Network (PSTN) and/or to a packet switching network, such as the Internet. Thus, according to the invention, instead of, for example, having to operate two different networks as in prior art, one used between the gateways and the MSCs and one between the MSCs and the BSCs, only one physical network needs to be managed, everything else being handled within that network on a logical level.

Also, with the use of DTM for providing connectivity according to the invention, bandwidth resources may at each time be logically allocated to those MSCs, BSCs or BTSs where they are needed the most.

For general information on DTM networks and on how DTM channels are established in a DTM network, reference is made to "The DTM Gigabit Network", Christer Bohm, Per Lindgren, Lars Ramfelt, and Peter Sjödin, Journal of High Speed Networks, Vol. 3, No. 2, pp. 109–126, 1994, and to ongoing standardization processes within the European Telecommunication Standards Institute (ETSI).

However, in brief, a dynamic synchronous Transfer Mode type network is a network having a dynamic frame structure in that the bandwidth of the network links are divided into recurrent, essentially fixed sized frames which in turn are divided into fixed size time slots, wherein write access to the time slot positions within the recurrent frame of a link is arbitrarily distributed to the nodes connected to the link to define logical channels on said link, said channels being defined by respective one or more time slot positions within said recurrent frame of the link. Consequently, the size of a channel will depend upon the number of time slots allocated to the channel. Moreover, the frame structure is dynamic in that the said distribution of write access to the time slot positions of a link may at any time be redefined, i.e. causing a redistribution of time slot access among the nodes attached to the link and/or among the channels served by the respective nodes. Also, in a Dynamic synchronous Transfer Mode type network, a channel may be defined to extend over several links (a link typically being a bus, double-bus, ring, double-ring, or a point-to-point connection), wherein the channel will be defined by a respective set of one or more time slot positions within the recurrent frames of the respective links that said channel is established over.

To be noted, even though the invention has been described primarily with reference to GSM, UMTS and GPRS systems, the invention shall of course not be considered limited thereto, the scope of the invention also encompassing other mobile networking standards and architectures of similar general design and structure.

DETAILED DESCRIPTION OF PREFERRED EMBODIMENTS

Figure 1:
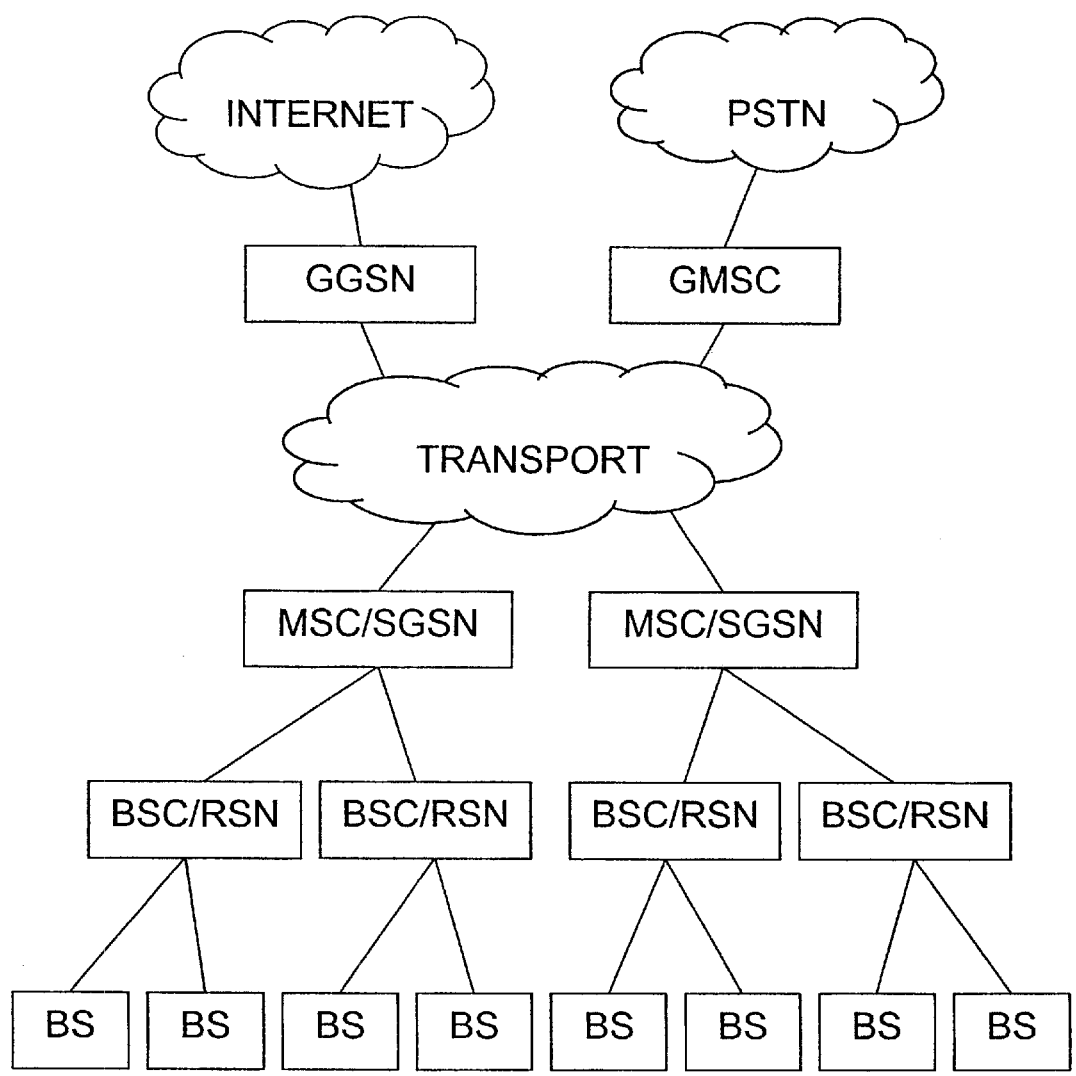
FIG. 1 schematically illustrates a prior art mobile communication network.

With reference to the accompanying drawings, FIG. 1 illustrates the basic architecture of a prior art mobile communication network, the design of which having been discussed above in the context of the background of the invention.

Figure 2A:
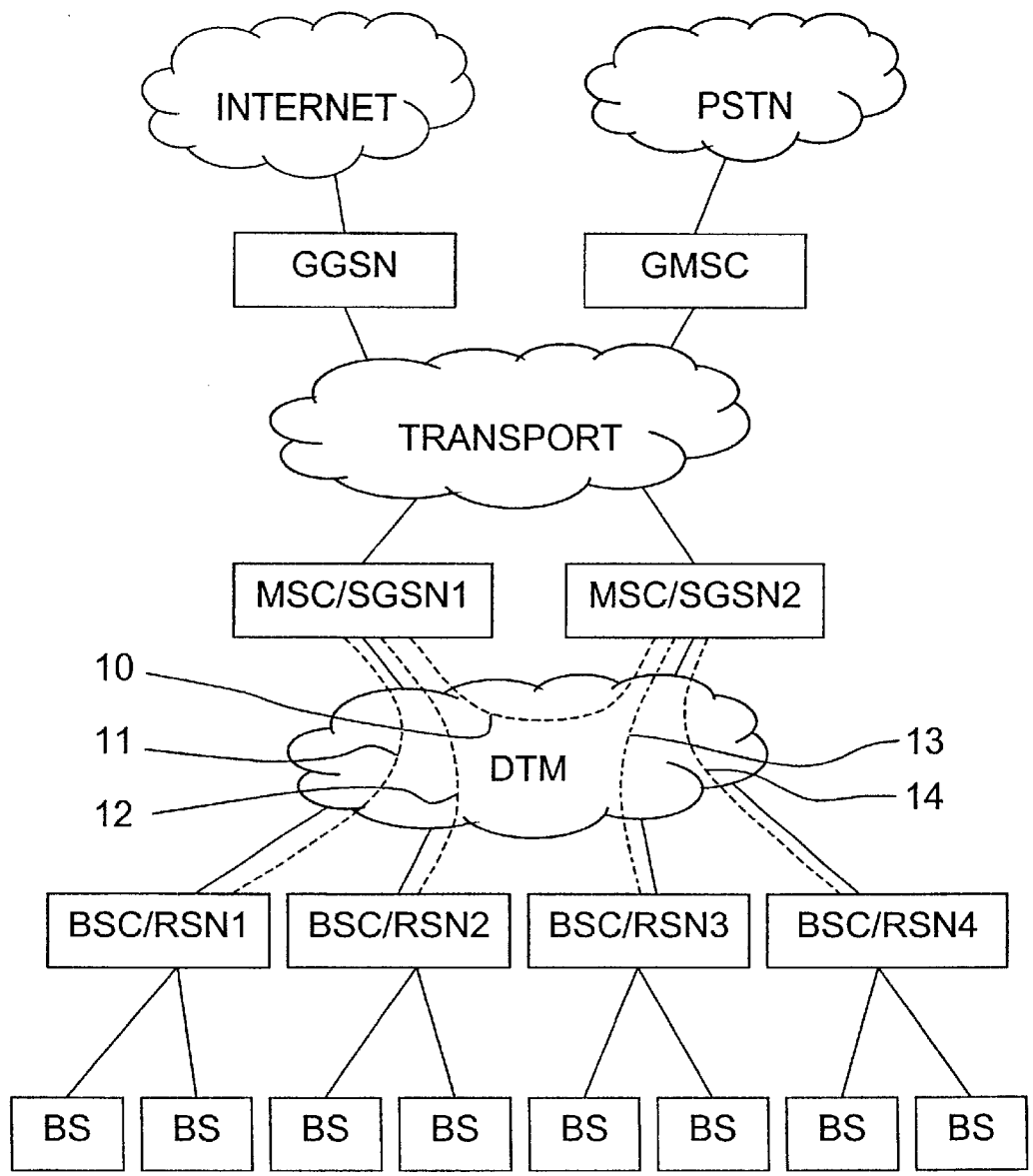
FIGS. 2A and 2B schematically illustrate a mobile communication network according to a first embodiment of the invention.
Figure 2B:
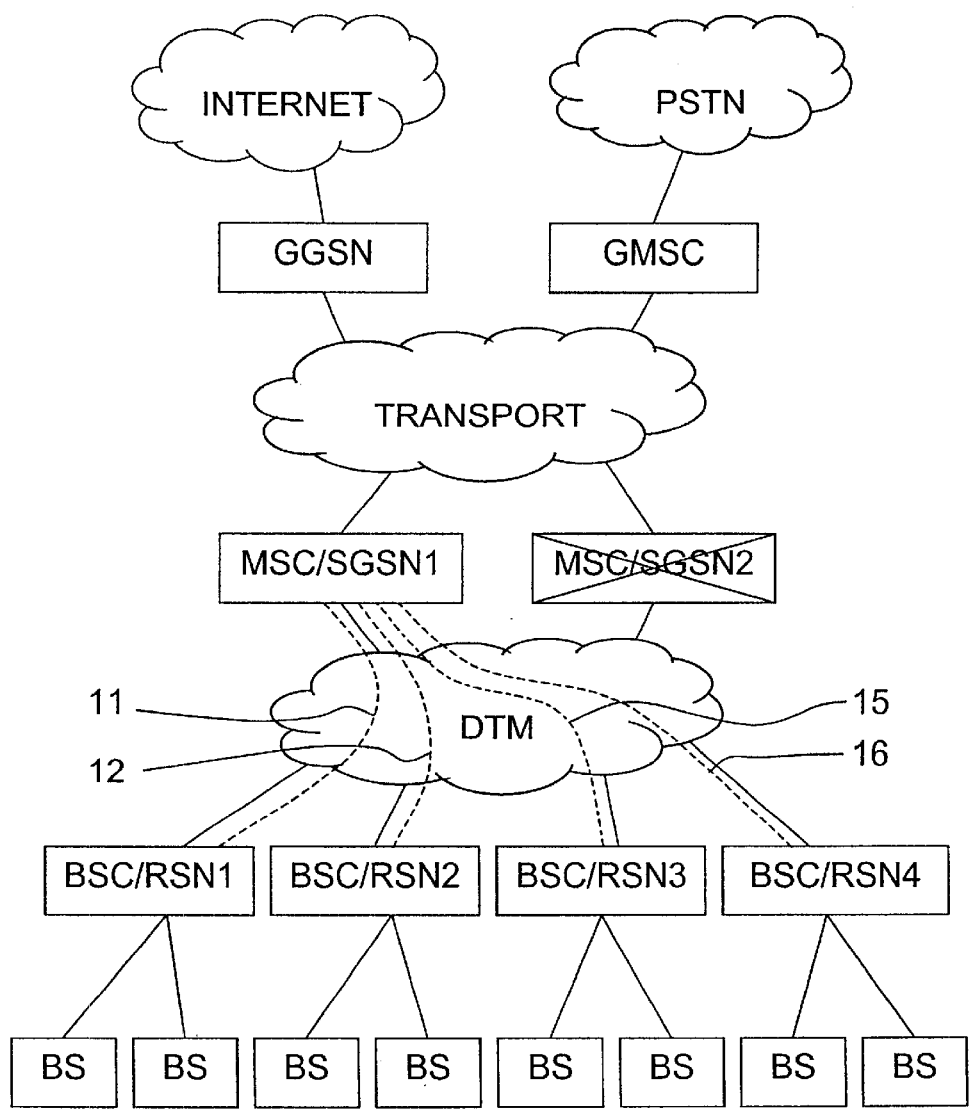

In FIGS. 2A and 2B, a mobile communication network according to a first embodiment of the invention is shown, wherein a DTM network is used to provide connectivity between mobile switching centers MSC/SGSN and base transceiver stations BS, more specifically in this embodiment by interconnecting the mobile switching centers MSC/SGSN and the base station controllers BSC/RSN.

As the MSCs and the BSCs are all connected to the same DTM network, logical DTM channels may be set up between any two of these components. Consequently, the design of the logical connectivity hierarchy within the network may be controlled and changed at any time by, for example, the network operator.

Specifically, in FIG. 2A, a first DTM channel 11 has been established between the first mobile switching center MSC/SGSN1 and the first base station controller BSC/RSN1, a second DTM channel 12 has been established between the first mobile switching center MSC/SGSN1 and the second base station controller BSC/RSN2, a third DTM channel 13 has been established between the second mobile switching center MSC/SGSN2 and the third base station controller BSC/RSN2, and a fourth DTM channel 14 has been established between the second mobile switching center MSC/SGSN2 and the fourth base station controller BSC/RSN4. Consequently, these four DTM channels form a logical connectivity within the DTM network that provides the same hierarchical relationship between the interconnected components as the hierarchy that was defined by the physical connectivity illustrated in the prior art network of FIG. 1.

Also illustrated in FIG. 2A is a DTM channel 10 established between the two mobile switching centers MSC/SGSN1 and MSC/SGSN2, making it possible for them to communicate also using the DTM network.

In FIG. 2B, it is assumed that some kind of failure has occurred with respect to the second mobile switching center MSC/SGN2, rendering it incapable of handling traffic in relation to the base stations controllers BSC/RSN3 and BSC/RSN4. As a result thereof, two new DTM channels 15 and 16 have been established between the first mobile switching center MSC/SGSN1 and the controller BSC/RSN3 and BSC/RSN4, respectively. Consequently, in this situation, the first mobile switching center may act as stand in for the second one as long as the latter is out of order.

Figure 3:
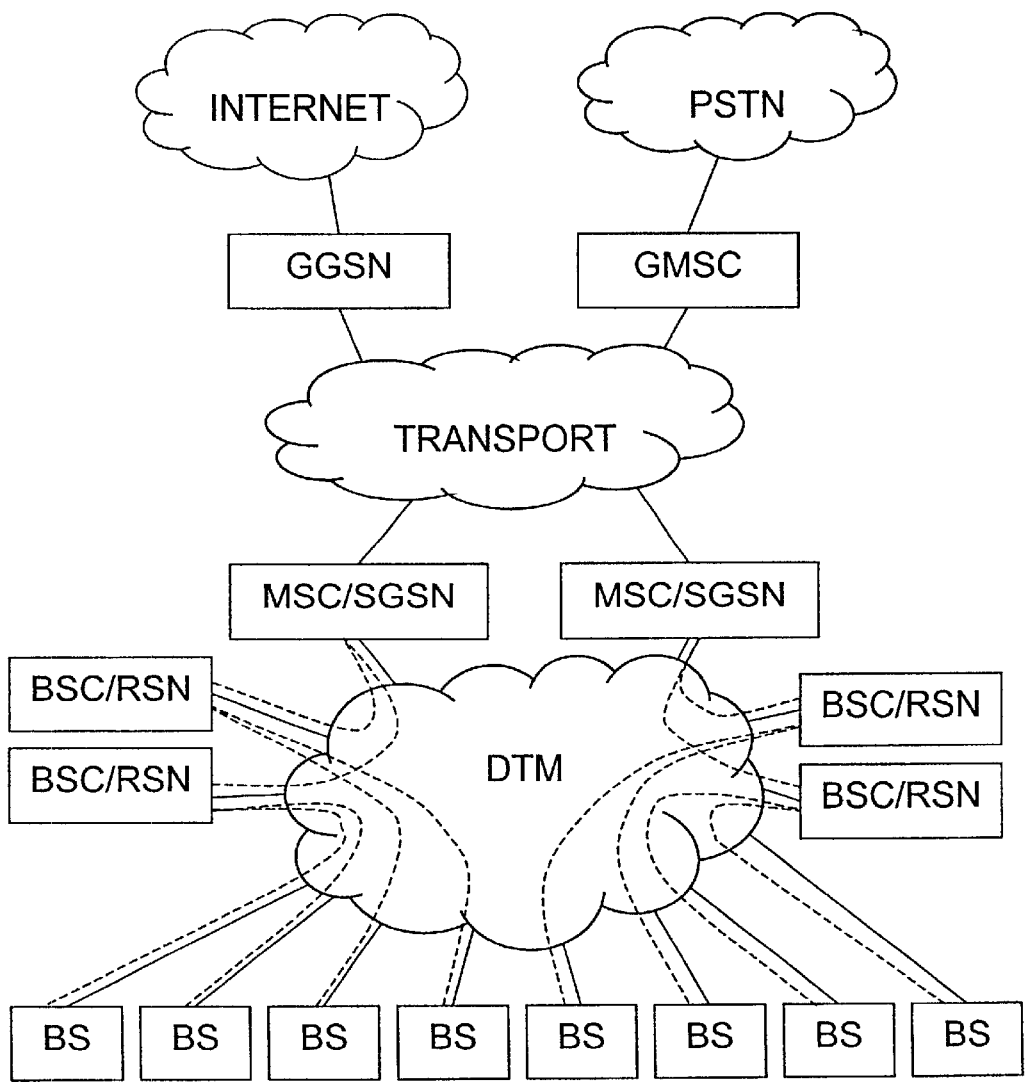
FIG. 3 schematically illustrates a mobile communication network according to a second embodiment of the invention.

In FIG. 3, a mobile communication network according to a second embodiment of the invention is illustrated, wherein one single DTM network is used to provide connectivity between the mobile switching centers MSC/SGSN and the base station controllers BSC/RSC as well as between the controllers and BSC/RSC and the base stations BS.

In similar manner to what has been described above with reference to FIGS. 2A and 2B, logical DTM channels (illustrated as dashed lines throughout the figures) are set up within the DTM network to form a logical connectivity within the DTM network that provides the same hierarchical relationship between the interconnected components as the hierarchy that was defined by the physical connectivity illustrated in the prior art network of FIG. 1. Also, reconfiguration of the hierarchical structure may be performed logically within the DTM network without changing the physical network in the same manner as described above with reference to FIG. 2B. As is understood, such reconfiguring may involve re-defining of logical channels between one or more mobile switching center and one or more base station controllers, between one or more base station controllers and one or more base transceiver stations, and/or a combination thereof.

Figure 4:
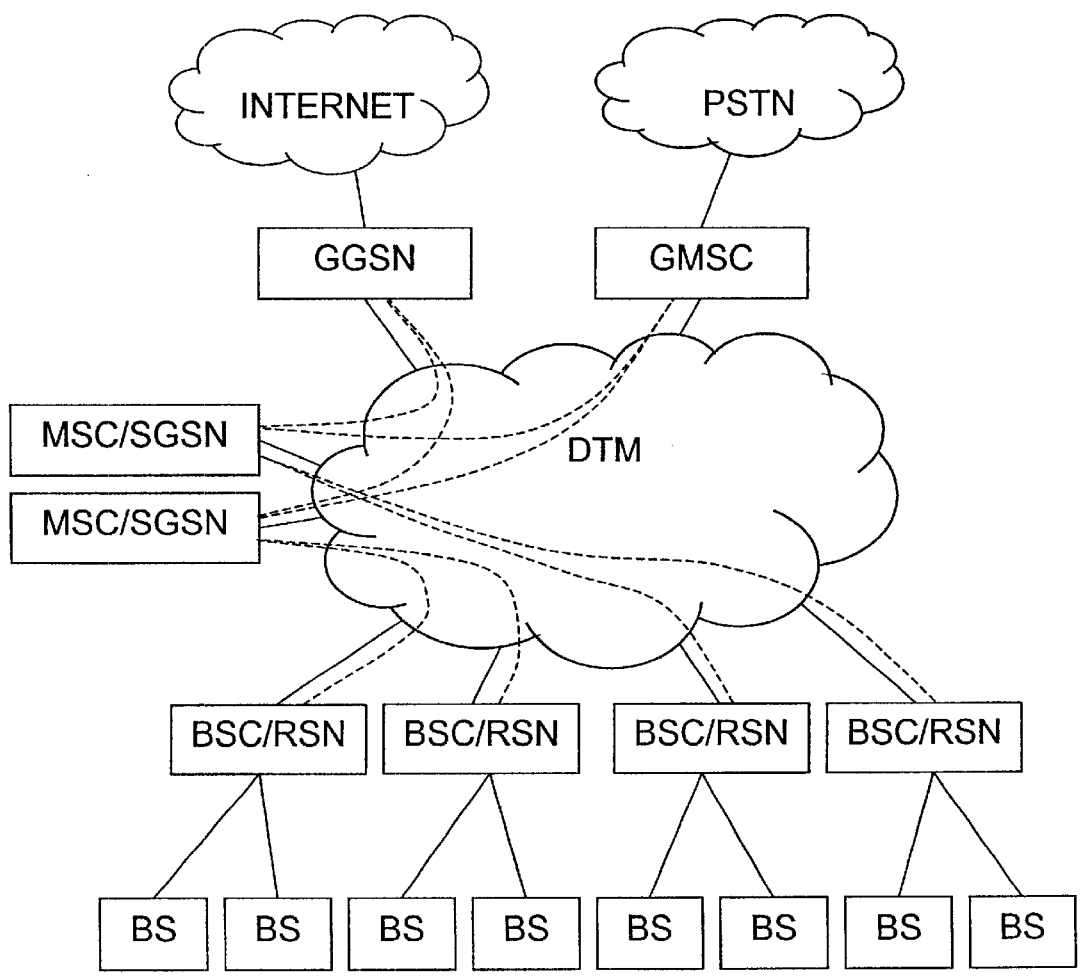
FIG. 4 schematically illustrates a mobile communication network according to a third embodiment of the invention.

In FIG. 4, a mobile communication network according to a third embodiment of the invention is illustrated, wherein one single DTM network is used to provide connectivity between the mobile switching centers MSC/SGSN and the base station controllers BSC/RSC, as well as, between the mobile switching centers MSC/SGSN and gateways GMSC and GGSN to a public switched telecommunication network PSTN and a packet data network, such as the Internet, respectively.

In similar manner to what has been described above with reference to FIGS. 2A and 2B, logical DTM channels are set up within the DTM network to logically interconnect the gateways and the mobile switching centers and to form a the same hierarchical relationship between the interconnected components as the hierarchy that was defined by the physical connectivity illustrated in the prior art network of FIG. 1. Also, reconfiguration of the hierarchical structure may be performed logically within the DTM network without changing the physical network in the same manner as described above with reference to FIG. 2B. Furthermore, as the size of any DTM channel may be increased or decreased, typically in steps of 512 kbps, the size of the DTM channels illustrated in FIG. 4 as well as in the other figures may be controlled in accordance with for example, the transfer capacity needed in relation to a specific base station, controller or switching center as a result of changing traffic loads.

Figure 5:
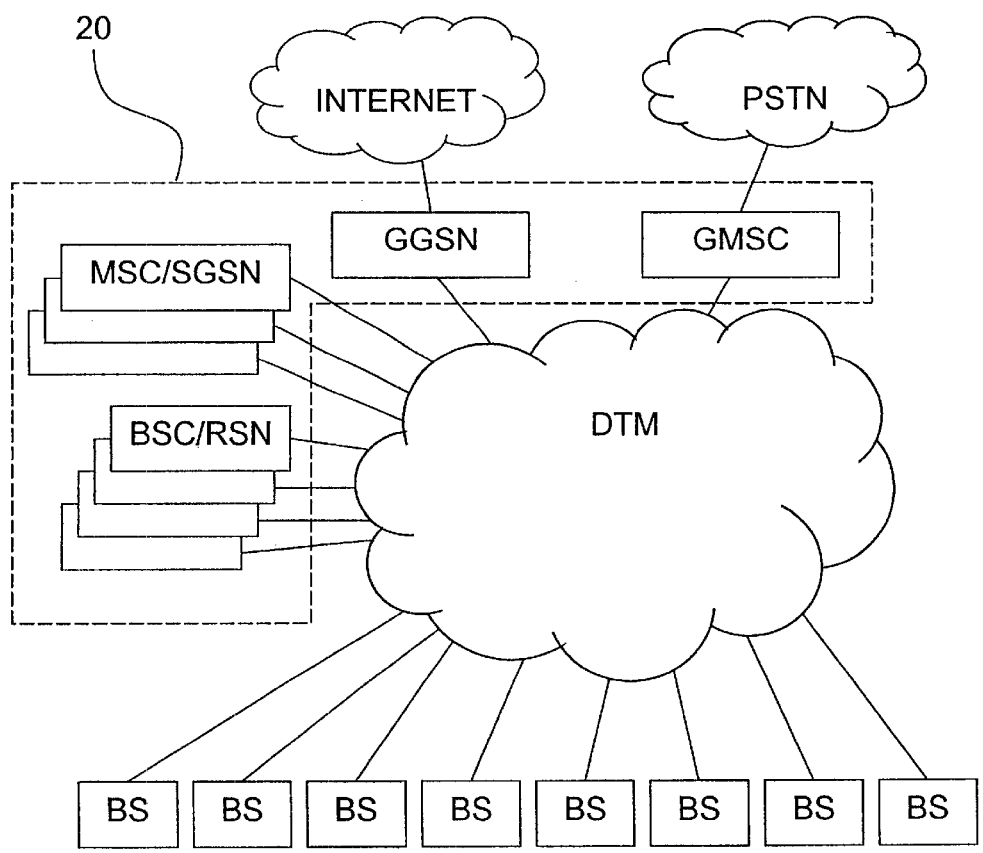
FIG. 5 schematically illustrates a mobile communication network according to a fourth embodiment of the invention.

In FIG. 5, a mobile communication network according to a fourth embodiment of the invention is illustrated, wherein one single DTM network is used to provide connectivity between the mobile switching centers MSC/SGSN and the base station controllers BSC/RSC, between the controllers and BSC/RSC and the base stations BS, as well as between the mobile switching centers MSC/SGSN and the gateways GMSC and GGSN.

In similar manner to what has been described above with reference to FIGS. 2A, 2B, 3, and 4, logical DTM channels are set up within the DTM network to establish the desired hierarchical connectivity relationship between the interconnected components. Also, as the prior art necessity of providing a physical, and consequently graphically distributed relationship between the interconnected components is at least in part reduced by the logical connectivity approach of the invention, FIG. 5 illustrates an example of how the mobile switching centers MSC/SGSN, the gateways GGSN and GMSC, and the controllers BSC/RNC have been physically located in a centralized manner at one single geographical site 20, thereby simplifying network maintenance and operation.

Figure 6:
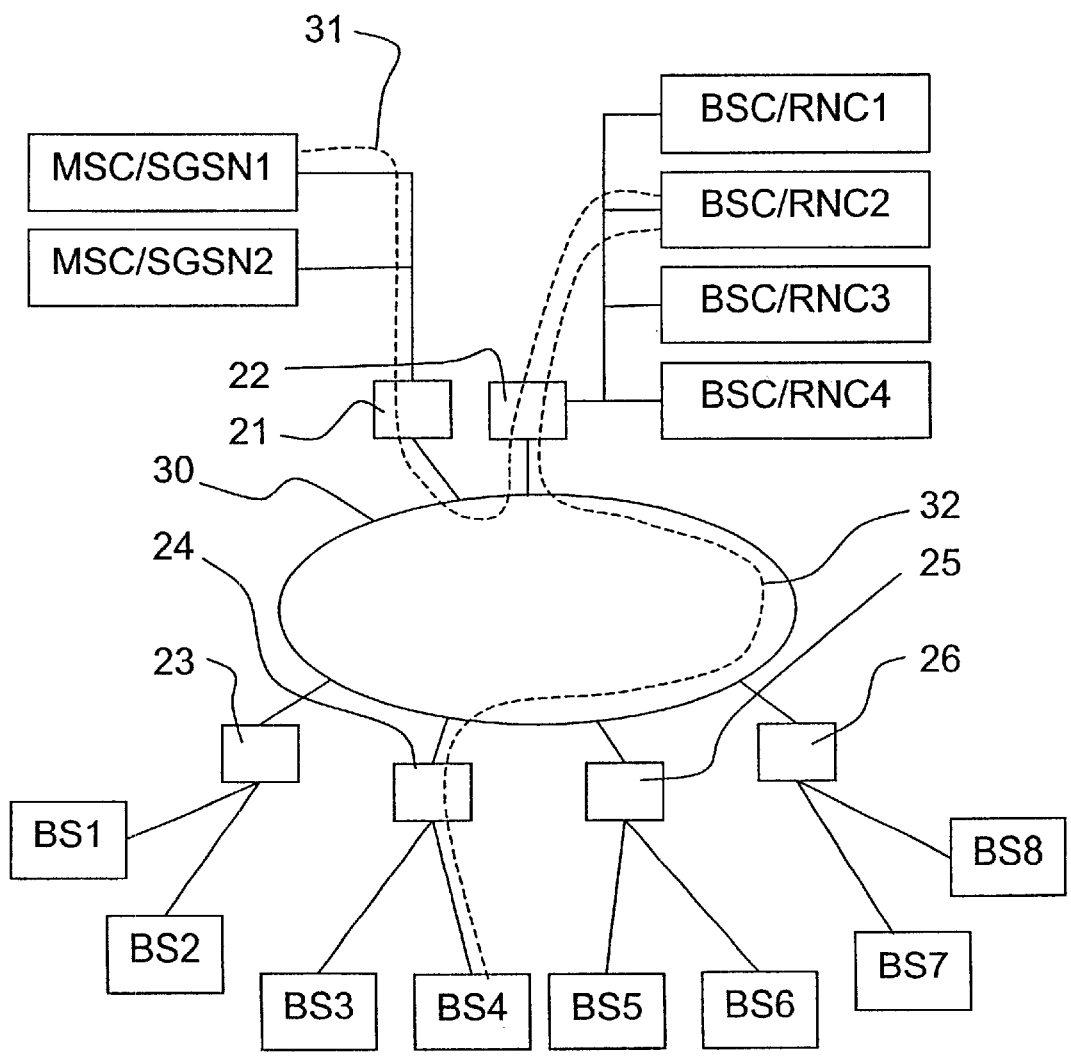
FIG. 6 schematically illustrates an architecture of a DTM network according to a fifth embodiment of the invention.

To exemplify in more detail how a DTM network architecture may be physically implemented in the context of the invention, FIG. 6 illustrates the architecture of the DTM network illustrated in FIG. 3 in more detail. In FIG. 6, six DTM switches 21–26 span the DTM network. All six DTM switches are physically connected to a dual ring bus 30 forming the core of the mobile network.

The first switch 21 is connected to the two mobile switching centers MSC/SGSN1 and MSC/SGSN2, and the second switch 22 is connected to the four base station controllers BSC/RNC1, BSC/RNC2, BSC/RNC3, and BSC/RNC4. Each one of the remaining four switches 23–26 is connected to a respective group of base transceiver stations BS via point-to-point links, although a ring bus could also have been used here as well. To be noted, it is in this example assumed that each one of the base transceiver stations is provided with a DTM uplink.

As a result of the features of a DTM network, a DTM channel may be established in almost any desired way over the DTM network. To illustrate an example thereon, the first mobile switching center MSC/SGSN1 in FIG. 6 may transmit data to the second base station controller BSC/RNC2 using a DTM channel 31 that has been established via switches 21 and 22. As another example, the second base station controller BSC/RNC2 may transmit data to the base station BS4 using a DTM channel 32 established via switches 22 and 24.

The switches 21–26 furthermore provide means for establishing, modifying and terminating such channels and for optionally increasing or decreasing the bandwidth thereof, for example based upon instructions received from a network management station (not shown). Furthermore, as the DTM network uses a synchronous frame rate of 8 kHz, this clock signal is preferably derived by the base transceiver stations BS to facilitate synchronization, for example in the context of multi base station transmissions.

It is to be understood that the above-described embodiments are merely illustrative of the principles of the invention. Various modifications and changes may be made thereto, by those skilled in the art, which will embody the principles of the invention and all within the spirit and scope thereof.

What is claimed is:

1. A method for transferring data in a mobile communication network, said method comprising:

transferring data between one or more mobile switching centers and one or more of a plurality of base stations via one or more controllers, each controlling a respective group of the plurality of base stations, at least in part using a Dynamic Synchronous Transfer Mode type network; and altering, at least in part, a hierarchical relationship between the mobile switching centers, the controllers, and the base stations by re-defining logical channels within the Dynamic Synchronous Transfer Mode type network when so required by a failure occurring within the mobile communication network.

2. The method of claim 1, further comprising controlling, at least in part, the hierarchical relationship between the mobile switching centers, the control stations, and the base stations by defining logical channels within the Dynamic Synchronous Transfer Mode type network.

3. The method of claim 1 further, comprising the step of transferring data between a gateway to a Public Switched Telecommunication Network and the one or more mobile switching centers using the Dynamic Synchronous Transfer Mode type network.

4. The method of claim 1, further comprising the step of transferring data between a gateway to a packet switched network and the one or more mobile switching centers using the Dynamic Synchronous Transfer Mode type network.

5. The method of claim 1, further comprising controlling the bandwidth allocated for transfer of data between a mobile switching center of the one or more mobile switching centers and a controller of the one or more controllers by controlling the size of a logical channel within the Dynamic Synchronous Transfer Mode type network.

6. The method of claim 1, further comprising controlling the bandwidth allocated for transfer of data between a controller of the one or more controllers and a base station of the set of base stations controlled by the controller by controlling the size of a logical channel defined within the Dynamic Synchronous Transfer Mode type network.

7. A mobile communication network comprising:

one or more mobile switching centers, each being associated with one or more controllers, each one of the one or more controllers controlling the operation of a respective set of base stations; and a Dynamic Synchronous Transfer Mode type network providing at least a part of the required connectivity between the one or more mobile switching centers and the base stations, and, further comprising means for altering, at least in part, a hierarchical relationship between the mobile switching centers, the controllers, and the base stations by re-defining logical channels within the Dynamic Synchronous Transfer Mode type network.

8. The mobile communication network of claim 7, further comprising means for controlling, at least in part, the hierarchical relationship between the mobile switching centers, the controllers, and the base stations by defining logical channels within the Dynamic Synchronous Transfer Mode type network.

9. The mobile communication network of claim 7, further comprising:

a gateway to a Public Switched Telecommunication Network;

the Dynamic Synchronous Transfer Mode type network providing connectivity between the one or more mobile switching centers and the gateway to the Public Switched Telecommunication Network.

10. The mobile communication network of claim 7, further comprising:

a gateway to a packet switching network, such as the Internet;

the Dynamic Synchronous Transfer Mode type network providing connectivity between the one or more mobile switching centers and the gateway to the packet switching network.

11. The mobile communication network of claim 7, further comprising means for controlling the bandwidth allocated for transfer of data between a mobile switching center of the one or more mobile switching centers and a controller of the one or more controllers by controlling the size of a logical channel within the Dynamic Synchronous Transfer Mode type network.

12. The mobile communication network of claim 7, further comprising means for controlling the bandwidth allocated for transfer of data between a controller of the one or more controllers and a base station of the set of base stations controlled by the controller by controlling the size of a logical channel defined within the Dynamic Synchronous Transfer Mode type network.

\* \* \* \* \*